US009715379B2

(12) United States Patent
He et al.

(10) Patent No.: US 9,715,379 B2
(45) Date of Patent: Jul. 25, 2017

(54) METHODS AND APPARATUS TO TRIGGER FIRMWARE UPDATE REQUEST IN RESPONSE TO A FAILURE EVENT

(75) Inventors: Xiao-Mei He, Beijing (CN); Yu Zhu, Beijing (CN)

(73) Assignee: GOOGLE TECHNOLOGY HOLDINGS LLC, Mountain View, CA (US)

(*) Notice: Subject to any disclaimer, the term of this patent is extended or adjusted under 35 U.S.C. 154(b) by 0 days.

(21) Appl. No.: 14/355,868

(22) PCT Filed: Dec. 9, 2011

(86) PCT No.: PCT/CN2011/083765
§ 371 (c)(1),
(2), (4) Date: May 2, 2014

(87) PCT Pub. No.: WO2013/082808
PCT Pub. Date: Jun. 13, 2013

(65) Prior Publication Data
US 2014/0304699 A1 Oct. 9, 2014

(51) Int. Cl.
*G06F 9/445* (2006.01)
*H04W 8/24* (2009.01)
*H04W 24/04* (2009.01)

(52) U.S. Cl.
CPC .............. *G06F 8/65* (2013.01); *H04W 8/245* (2013.01); *H04W 24/04* (2013.01)

(58) Field of Classification Search
CPC .......... G06F 8/65; H04W 8/245; H04W 24/04
See application file for complete search history.

(56) References Cited

U.S. PATENT DOCUMENTS 7,987,449 B1* 7/2011 Marolia .................... G06F 8/68 709/220
2001/0049263 A1* 12/2001 Zhang ....................... G06F 8/65 455/67.11

(Continued)

FOREIGN PATENT DOCUMENTS

CN 1852537 A 10/2006
CN 1852537 A 10/2006

(Continued)

OTHER PUBLICATIONS

Janagoudar Sanganagouda, "USSD: A Communication Technology to Potentially Oust SMS Dependency", Sep. 2011. Aricent.*

(Continued)

*Primary Examiner* — Li B Zhen
*Assistant Examiner* — Amir Soltanzadeh
(74) *Attorney, Agent, or Firm* — Morris & Kamlay LLP

(57) ABSTRACT

A message processing system, such as an Unstructured Supplementary Service Data (USSD) gateway, sends a first message having a specific type of data content to a wireless communications device within a wireless communications network. In response to being unable to process the specific type of data content, the wireless communications device sends an error message to the message processing system. In response to receipt of the specific error message, the message processing system automatically triggers a transmission of a firmware upgrade notification message (e.g., a Wireless Application Protocol PUSH message) to the wireless communications device, which triggers the wireless communications device to request a firmware upgrade, from an external server (e.g., a Firmware Over The Air server), that enables the wireless communications device to become capable of processing the specific type of data content.

18 Claims, 5 Drawing Sheets

400

(56) References Cited

U.S. PATENT DOCUMENTS

| | | | | |
|---|---|---|---|---|
| 2008/0065816 | A1 | 3/2008 | Seo | |
| 2009/0075641 | A1* | 3/2009 | Guven et al. | 455/419 |
| 2010/0125610 | A1* | 5/2010 | Zaffino | G06F 17/30017 707/793 |
| 2010/0135201 | A1 | 6/2010 | Lewis et al. | |
| 2011/0265075 | A1* | 10/2011 | Lee | 717/171 |
| 2012/0264462 | A1* | 10/2012 | Shen et al. | 455/466 |

FOREIGN PATENT DOCUMENTS

| | | | |
|---|---|---|---|
| CN | 101184301 | A | 5/2010 |
| CN | 101184301 | A | 5/2010 |
| CN | 102217337 | A | 10/2011 |
| IE | S20001002 | A2 | 7/2001 |
| WO | 2010148682 | A1 | 12/2010 |
| WO | 20101487561 | A1 | 12/2010 |
| WO | 2012022072 | A1 | 2/2012 |

OTHER PUBLICATIONS

Patent Cooperation Treaty, International Search Report and Written Opinion of the International Searching Authority for International Application No. PCT/US2011/083765, Sep. 13, 2012, 12 pages.

Notice of Preliminary Rejection issued in Korean Application No. 10-2014-7018833 on Jul. 16, 2015.

3GPP, "3rd Generation Partnership Project; Technical Specification Group Core Network and Terminals; Unstructured Supplementary Service Data (USSD); Stage 3 (Release 10)", 3GPP TS 24.090, V10.0.0 (Mar. 2011), Mar. 2011, 13 pages.

"Communication Under Rule 71(3) EPC", Application No. 11 877 124.5-1854, Mar. 16, 2016, p. 42.

Extended European Search Report mailed in Application No. 11877124.5 on Jul. 15, 2015.

First Office Action mailed Feb. 3, 2017 in Chinese Patent Application No. 201180075393.7.

* cited by examiner

METHODS AND APPARATUS TO TRIGGER FIRMWARE UPDATE REQUEST IN RESPONSE TO A FAILURE EVENT

BACKGROUND

1. Technical Field

The present invention relates in general to wireless communications devices and in particular to firmware upgrades in wireless communications devices.

2. Description of the Related Art

The Unstructured Supplementary Service Data (USSD) messaging structure has been utilized within Global System for Mobile Communications (GSM) as a messaging type for transmitting USSD requests and/or USSD notifications to GSM-enabled wireless devices and/or user equipment. USSD provides session-based communication for transmitting messages to wireless communications devices within a wireless communications network. For example, USSD is used to send text between a wireless communications device and an application program within the network, such as prepaid roaming or mobile chatting. USSD is similar to Short Messaging Service (SMS), but, unlike SMS, USSD transactions occur only during the session. With SMS, messages can be sent to a wireless communications device and stored for several days if the device is not activated or within range.

USSD functionality is not supported by current Code Division Multiple Access (CDMA) networks. As a result, Third Generation Partnership Project 2 (3GPP2) has initiated development of this functionality for CDMA networks. When the CDMA infrastructure becomes capable of supporting USSD functionality, USSD service can be deployed across and throughout the GSM and CDMA network coverage area. However, the legacy CDMA mobile devices do not support the USSD feature, and as such, these legacy mobile devices cannot recognize the type of data content that is provided within a USSD message. As a result, USSD requests received at the CDMA legacy device will result in a failure event, regardless of whether the USSD request originated from a USSD enabled device or server of the GSM network or from a USSD enabled CDMA device or server within the overlapping GSM-CDMA network. Given the large number of legacy CDMA mobile devices, the large number of failure events resulting from an inability of these legacy CDMA mobile devices to support the USSD feature presents a major challenge to wireless communications networks.

BRIEF DESCRIPTION OF THE DRAWINGS

The described embodiments are to be read in conjunction with the accompanying drawings, wherein.

DETAILED DESCRIPTION

Figure 1:
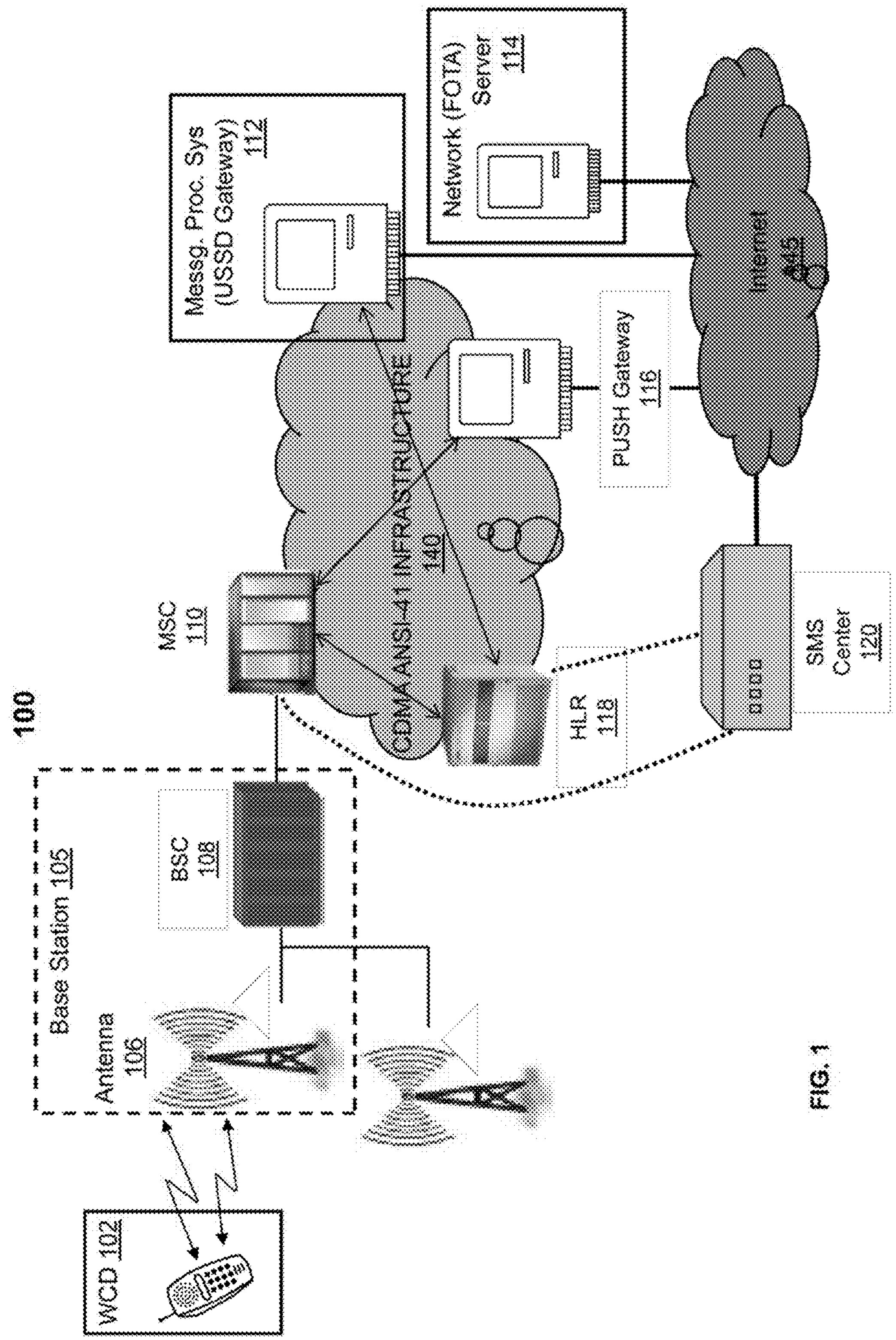
FIG. 1 is an example wireless communications network having both Global System for Mobile Communications (GSM) and Code Division Multiple Access (CDMA) network components and an Unstructured Supplementary Service Data (USSD) gateway, according to one embodiment.

The illustrative embodiments provide a method and message processing system for triggering a firmware update request at a wireless communications device in response to a failure event occurring at the wireless communications device. A message processing system such as an Unstructured Supplementary Service Data (USSD) gateway sends a first message having a specific type of data content to a wireless communications device within a wireless communications network. In response to being unable to recognize and/or process the specific type of data content, the wireless communications device sends an error message to the message processing system. In response to receipt of the specific error message, the message processing system automatically triggers a firmware upgrade notification message generation and transmission as a Wireless Application Protocol (WAP) PUSH message to the wireless communications device. Following receipt of the firmware upgrade notification message, the wireless communications device requests, from an external server, a firmware upgrade that enables the wireless communications device to become capable of recognizing and processing the specific type of data content. When the wireless communications device is capable of receiving Firmware Over The Air (FOTA) transmissions, the external server forwards the firmware upgrade via a FOTA transfer.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names (such as those of the executing utility/logic/firmware described herein) are for example only and not meant to imply any limitations on the described embodiments. The embodiments may thus be described with different nomenclature/terminology utilized to describe the components, devices, and/or parameters herein, without limitation. References to any specific protocol or proprietary name in describing one or more elements, features or concepts of the embodiments are provided solely as examples of one implementation, and such references do not limit the extension of the claimed embodiments to embodiments in which different element, feature or concept names are utilized. Thus, each term utilized herein is to be given its broadest interpretation given the context in which that terms is utilized.

As further described below, implementation of the functional features of the invention described herein is provided within processing devices/structures and can involve use of a combination of hardware, firmware, as well as several software-level constructs (e.g., program code) that execute to provide a specific utility for the device. The presented figures illustrate both hardware components and software/logic components within example wireless communications device architecture.

With specific reference now to FIG. 1, there is depicted a block diagram of an example wireless communications network 100, within which certain of the functional aspects of the described embodiments may advantageously be implemented. For simplicity, wireless communications network 100 shall be referred to herein simply by the acronym WCN 100. In particular, in at least one embodiment, WCN 100 represents one of a Code Division Multiple Access (CDMA) network and a hybrid or combined network that supports CDMA as well as other wireless communication protocols. Examples of these hybrid networks and/or protocols include TDD-CDMA (i.e., Time Division Duplexing-CDMA), FDD-CDMA (i.e., Frequency Division Duplexing-CDMA) and MC-CDMA (i.e., Multi-Carrier-CDMA) networks. However, in alternate embodiments, WCN 100 can be another type of wireless communications network, such as GSM, in which at least one wireless communication device 102 operating within the wireless communication network is unable to recognize and/or process a particular type of data content originating from a component within the WCN and therefore requires a firmware upgrade to do so. In one or more embodiment, WCN 100 utilizes American National Standards Institute-41 (ANSI-41) standard and signaling over signaling system 7 (SS7) links to enable communication of specific messages and data between network components, such as MSC 110 and HLR 118, and devices, including USSD Gateway 112 and PUSH Gateway 116.

WCN 100 includes wireless communications device (WCD) 102, which can be a mobile device, mobile station, a cell phone, a smartphone or a CDMA enabled wireless device. In one embodiment, WCD 102 is a subscriber device to WCN 100 and wirelessly connects to the infrastructure of WCN 100 via base station (BS) 105, which comprises base station antenna 106 and a base station controller 108. Base station antenna 106 provides an access point to WCN 100 for WCD 102.

In addition to the base station components 106 and 108, the infrastructure of WCN 100 comprises mobile switching center (MSC) 110, which is connected to BSC 108 as well as to a backbone of interconnected functional servers of WCN 100. MSC 110 is the primary service delivery node for Global System for Mobile Communications (GSM) and/or CDMA, and MSC 110 is responsible for routing voice calls and SMS as well as other services (such as conference calls, facsimile and circuit switched data) between user devices connected to WCN 100. MSC 110 sets up and releases the end-to-end connection (e.g., between wireless communications devices), and MSC 110 handles mobility and hand-over requirements during a call. Indicated within network infrastructure 140 of WCN 100 are arrows interconnecting the network components representing bi-directional ANSI-41 signaling and/or messaging.

As shown, MSC 110 connects to and communicates with several other network components, such as Unstructured Supplementary Service Data (USSD) gateway 112, Wireless Access Protocol (WAP) PUSH gateway 116, Home Location Register (HLR) 118 and Short Message Service (SMS) center 120. HLR 118 is a key component of wireless communications networks such as GSM, Time Division Multiple Access (TDMA), and CDMA networks. HLR 118 is a central database that contains details of each wireless communications device (e.g., WCD 102) that is authorized to use the CDMA network. The HLR 118 is the main database of permanent subscriber information, including customer profiles, for wireless communications network 100. The HLR 118 contains pertinent user information, such as account information, account status, user preferences, features subscribed to by the user, and user's current location. The data stored in HLRs for the different types of networks is similar but can differ in some details.

Several of the devices are in turn connected to each other via a different background network, indicated as the Internet 145. Thus, as shown, USSD Gateway 112, WAP PUSH gateway 116, and SMS center 120 are connected to the Internet 145. Also connected to the Internet 145 is a Network server 114, which, in one or more embodiments, can be a firmware over the air (FOTA) server, and is therefore interchangeably described herein as FOTA Server 114. References to a specific implementation of a FOTA server 114 throughout the description is not intended to be limiting on the disclosure, as the described embodiments can be implemented using other types of network servers that can provide firmware upgrades directly to a WCD 102 via any medium. As described herein, USSD Gateway 112 represents an example of a messaging device, which is also referred to herein as a message processing system (see FIG. 2 and description below). USSD gateway 112 is able to connect via network infrastructure 140 to HLR 118. In addition, USSD gateway 112 is able to connect via Internet 145 to PUSH gateway 116, SMS center 120, and FOTA server 114.

USSD Gateway 112 is configured to send to a wireless communications device at least one of: (a) a USSD notification; and (b) a USSD request. The USSD notification operation type is invoked by the network to give an unstructured supplementary service notification to the mobile user. The USSD request operation type is invoked by the network to request unstructured information from the wireless communications device in order to perform an unstructured supplementary service data application. The USSD request message and USSD notification message may be individually and more generally referred to herein as a USSD message. USSD Gateway 112, as well as other network components, provides specific functionality that are described in greater detail in the below description of FIG. 2.

Figure 2:
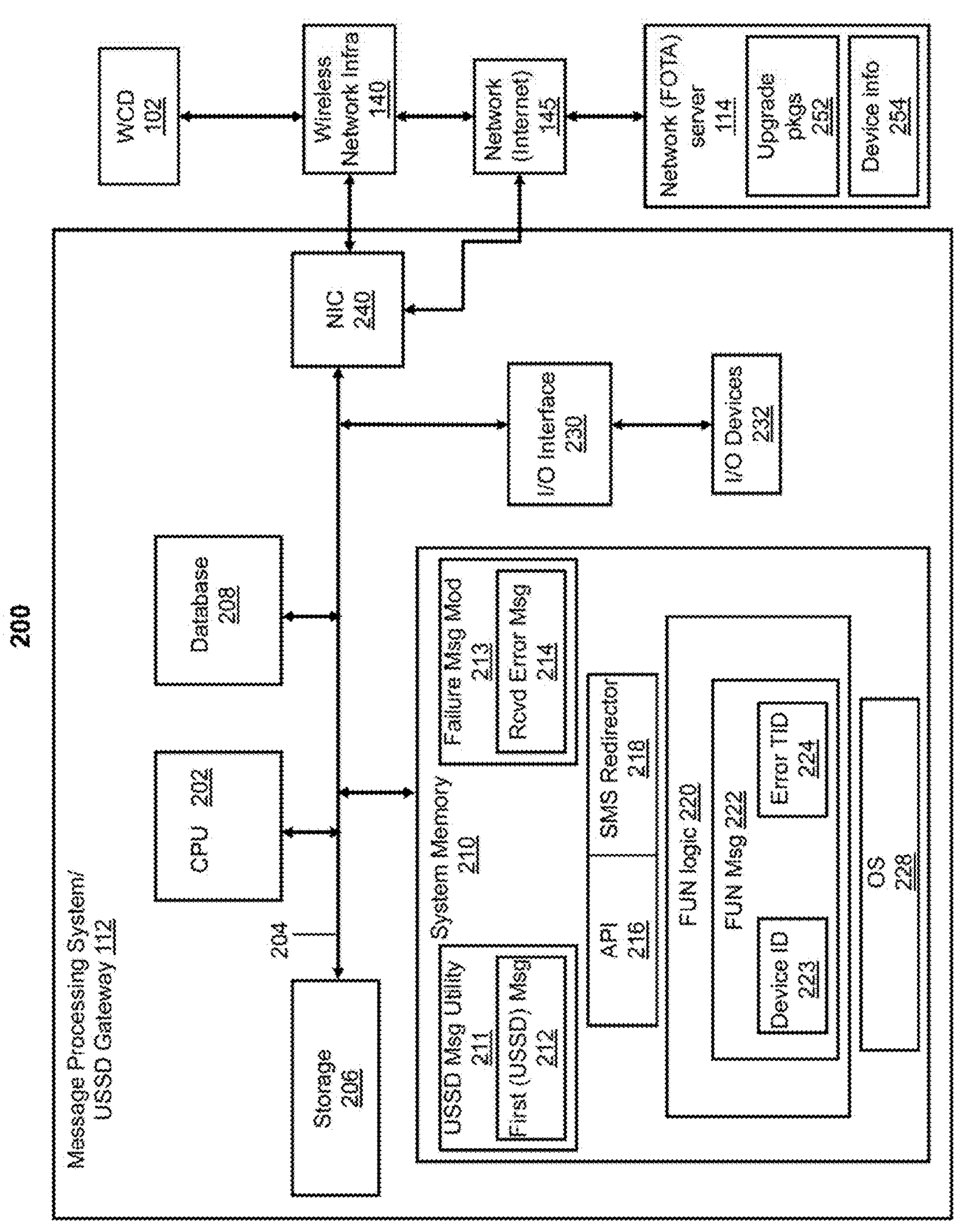
FIG. 2 is a block diagram representation of an example message processing system, such as a USSD gateway, within which features of the described embodiments can be incorporated, according to one embodiment.

FIG. 2 illustrates a block diagram representation of a communication system 200 depicting hardware and firmware aspects of an example message processing system that is connected to other devices that make up a wireless communications network, according to one embodiment. Message processing system 112 can be a server, a personal computer, and/or other types of electronic devices that may generally be considered processing devices. As illustrated, message processing system 112 is connected via example physical network, Internet 145, to a FOTA server 114 and via a wireless network 140 to WCD 102. Message processing system 112 comprises at least one processor, including central processing unit (CPU) 202, which is connected to system memory 210 via system bus 204. Also connected to system bus 204 is storage 206, within which a database 208 can be maintained and at which information, such as data, program instructions or program code can be stored and later retrieved. Message processing system 112 can also comprise an input/output (I/O) interface 230, which provides connectivity and control for the generally illustrated I/O devices 232.

Additionally, to enable external connection to other network components, message processing system 112 also includes at least one communications port that is illustrated by network interface component (NIC) 240. Message processing system 112 utilizes NIC 240 to connect to network infrastructure 140, which in one embodiment, collectively represents a CDMA-enabled wireless network supporting ANSI-41 messaging protocols. In one embodiment, message processing system 112, when configured as a USSD gateway, sends USSD requests and/or USSD notifications to WCD 102 via wireless network infrastructure 140. Message processing system 112 also utilizes NIC 240 to connect to a physical data network 145, which can be the Internet. As defined herein, the Internet is a worldwide collection of networks and gateways that utilize the Transmission Control Protocol/Internet Protocol (TCP/IP) suite of protocols to communicate with one another. NIC 240 can be configured to operate via wired or wireless connection to the data network 145. Connection with one or more servers, including, for example, FOTA server 114, can be established via data network 145. As illustrated, FOTA server 114 comprises at least one firmware upgrade package 252 and mobile device ID information 254.

In addition to the above described hardware components of message processing system 112, various features of the invention are completed and/or supported via software and/or firmware code stored within system memory 210 or other storage 206 and executed by CPU 202. Thus, for example, illustrated within system memory 206 are operating system (OS) 228 and a plurality of software and/or firmware and/or data components, including USSD message generation utility 211. USSD message generation utility 211 generates a first USSD message 212, which is by default a USSD request or USSD notification message. These components further comprise failure message evaluation module 213, which determines an error type of an error message(s) 214 that is received in response to transmitting a first USSD message 212 to WCD 102.

System memory 210 also comprises application programmable interface (API) 216 and short message service (SMS) redirector 218. Short Message Peer-to-Peer (SMPP), Hypertext Transfer Protocol (HTTP), and Extensible Markup Language (XML) protocols collectively represent APIs that are used for communications between the USSD Gateway 112 and external applications (e.g., SMS center, Billing System, Third Party Applications and Customer Care). These applications can use any of the APIs to connect to USSD Gateway 112. These APIs are generally employed for client-server based applications by which send-receive types of messages are communicated using TCP/IP socket connections.

In one embodiment, SMS Redirector 218 enables SMS messages to include redirection information that allows message recipients to interact with the redirection information and be directed to a desired URL or network accessible location. For example, USSD gateway 112, via USSD utility/logic 211, is able to trigger an intermediary network component, such as SMS Center 120 to send to WCD 102 a firmware upgrade notification message (e.g., notification 222) having redirection information that includes a URL for a server location that provides firmware upgrades. Upon receipt of firmware upgrade notification message 222, WCD 102 is able to access the server location via the URL to receive firmware upgrades from a specific server (e.g., FOTA server 114).

In addition, system memory 210 comprises Firmware Upgrade Notification logic/utility 220, which for simplicity in describing the embodiments will hereinafter be referred to by the acronym FUN logic 220. In actual implementation, the functionality of FUN logic 220 can be combined with and/or include that of one or more of the other components within system memory 210 to provide a single executable component that provides the various functions of each individual component. Thus, for simplicity, FUN logic 220 is illustrated and described as a single firmware logic that encompasses all of the functionality of the above introduced program modules.

In addition to the software modules, system memory 210 can also comprise data that is received and/or generated during execution and/or operation of one or more of the above software modules. Among these data are wireless device identifier (ID) 223 and error type ID 224 utilized within firmware upgrade notification message 222. These various data are utilized by the message processing system 112 to enable the message processing system 112 to (a) correctly identify a wireless device at which the message failure occurred and (b) correctly identify an error type, according to specifications for a specific type of firmware upgrade notification message (e.g., a notification message for a FOTA upgrade).

Certain of the functions supported and/or provided by each of the above functional logic components, e.g., FUN logic 220, are implemented by executing software code on CPU 202 of message processing system 112 to cause message processing system 112 to perform the specific functions with CPU and other hardware components of message processing system 112. Included among the program code and/or programmable logic provided by these functional logic components within FUN logic 220 are:

(a) logic for detecting receipt of an error message from a wireless communications device following transmission of a request message having a first type of data content to the wireless communications device;

(b) logic for determining whether the error message indicates that the wireless communications device is unable to process the first type of data content;

(c) logic for, in response to determining that the wireless communications device is unable to process the first type of data content, initiating transmission of a firmware upgrade notification message to the wireless communications device;

(d) logic for sending the firmware upgrade notification message via an intermediary network component (e.g., an SMSC) to the wireless communications device; and (e) logic for triggering a utilization of the firmware upgrade notification message to access a network location to request and perform a firmware upgrade.

According to the illustrative embodiments, when CPU 202 executes FUN logic 220, message processing system 112 initiates a series of processes that enable the above functional features as well as additional features/functionality. These features/functionalities are described in greater detail below with further descriptions of FIGS. 1-2 and within the description of FIGS. 3-5.

Those of ordinary skill in the art will appreciate that the hardware components and basic configurations depicted in FIG. 1 and FIG. 2 may vary. The illustrative components within WCN 100 and within message processing system 112 are not intended to be exhaustive, but rather are representative to highlight essential components that are utilized to implement the present invention. For example, other devices/components may be used in addition to or in place of the hardware and/or firmware depicted. The depicted example is not meant to imply architectural or other limitations with respect to the presently described embodiments and/or the general invention.

As previously indicated, in one embodiment, message processing system 200 can be an unstructured supplementary service data (USSD) gateway (e.g., USSD gateway 112). Thus, message processing system 112 can interchangeably be referred to as USSD gateway 112 in one specific application of the described embodiments.

Certain aspects of the disclosure will now be described with reference to FIGS. 1 and 2. As an initial operation, message processing system 112 sends a first message (e.g., USSD message 212) having a first type of data content to a wireless communications device (e.g., WCD 102) within WCN 100. As utilized herein, references to the type of data content can be understood to mean one or more of a message format, an encoding utilized for the data provided within the message, a particular command, instruction, descriptor, or operation within the message that is not known to the WCD, or generally any message characteristics that makes the received message one that the WCD cannot recognize, interpret, decode, and/or process. Additionally, the type of data content is specific to the type of message being sent, and is assumed to be a type that can be recognized by the WCD once the WCD has the correct firmware to process the message type and/or data type. The specific application described by the embodiments references a USSD message type, which is not recognizable by or capable of being processed by legacy CDMA devices, without first upgrading the firmware of those legacy devices. If WCD 102 is able to successfully process the first message, i.e., is able to decipher and/or recognize and consume the first type of data content, WCD 102 performs one or more required operations, corresponding to the particular operation required by the first message. In one embodiment, the data content can be an embedded content and/or a descriptor for an operation type. For example, in the case of a USSD message, the type of data content that WCD 102 may not be able to process includes a descriptor for a USSD request operation and/or a descriptor for a USSD notification operation. However, if WCD 102 is unable to process the data content and, in particular, if WCD 102 does not have the required firmware to be able to identify and/or consume the type of the data content, WCD 102 generates an error message (214) and sends the error message 214 to the USSD Gateway 112 via the wireless network infrastructure 140. In one embodiment, WCD 102 is unable to recognize the first type of data content from a first message type (e.g., a USSD message) but is capable of recognizing a second type of content from a second message type (e.g., an SMS message). It is appreciated that WCD 102 is capable of generating error messages associated with various types of errors and forwarding the error message to the BSC 108, in response to the error occurring at the WCD 102. BSC 108 has the required intelligence to determine which network device (e.g., USSD gateway 112) the first message originated from, and BSC 108 can forward the error message to that network device via the MSC 110.

In response to receipt of the error message 214, USSD Gateway 112 retrieves information about an error type from the error message 214. The error type indicates a reason for a failure event associated with the first message at WCD 102. In one embodiment, a first error type among multiple different possible error types specifically indicates that WCD 102 does not support a type of data content within the first message. In response to the error message indicating that WCD 102 does not support either the type of the data content or the operation type descriptor, USSD Gateway 112 automatically generates a firmware upgrade notification message 222 (e.g., WAP PUSH message) and triggers a transmission of the firmware upgrade notification message 222 to WCD 102. In the context of the disclosure, the terms automatic and/or automatically refer to a process or function that is performed by a processing device or component independent of any device user action. In response to receipt of a firmware upgrade notification message 222, WCD 102 requests, from an accessible network server (e.g., FOTA server 114), a firmware upgrade that enables WCD 102 to become capable of supporting the first type of data content. In one embodiment, USSD Gateway 112 includes within the firmware upgrade notification message 222 the access information of a specific network location, for example, a universal resource locator (URL), which is accessible by WCD 102. The WCD 102 can then access the network location and request the firmware upgrade.

USSD Gateway 112 generates firmware upgrade notification message 222 in response to determining, from the received error message, that WCD 102 is unable to support the first type of data content associated with the first message. USSD Gateway 112 sends notification message 222 to an intermediary network component that provides further messaging operations. The intermediary network component forwards notification message 222 containing at least one second type of data content that is recognized and/or can be processed and consumed by WCD 102. The intermediary network component responds to receipt of notification message 222 by forwarding the firmware upgrade notification message to WCD 102.

In one embodiment, the intermediary network component is one of a PUSH Gateway 116 or an SMS Center 120. Alternatively, in another embodiment, USSD Gateway 112 sends notification message 222 to more than one intermediary network component. For example, referring to FIG. 1, the example message processing system, USSD Gateway 112, operating as a PUSH initiator, transmits the notification message 222 to PUSH Gateway 116, which represents a first intermediary network component. A PUSH Gateway is a component of WAP Gateways that pushes URL notifications to wireless communications device. In one embodiment, the notification provides a text string with a URL link. In an alternate embodiment, only a notification is pushed to the device and the device is required to perform some operation or function associated with the notification in order to download or view the content associated with the notification. The Push Gateway 116 has two avenues for delivery of the received PUSH message to WCD 102. If the Internet Protocol (IP) address of WCD 102 is known to PUSH Gateway 116, PUSH Gateway can deliver the notification message 222 directly to WCD 102 over an IP network connection. This delivery is known as "Connection Oriented Push". If the IP address of WCD 102 is not known to PUSH Gateway 116, PUSH Gateway 116 delivers the notification message over an SMS connection. If USSD Gateway 112 or the PUSH Gateway 116 sends the notification message via SMS, SMS center 120 would then represent a second intermediary network component to which the notification message 222 is forwarded. Delivery of a message, such as notification message 222, via SMS center 120 is known as "Connectionless Push" in the wireless technology art.

Returning again to the general example of FIG. 2, to accommodate delivery of the notification message using SMSC 120, the message processing system 112 either constructs the notification message as a SMS PUSH message or enables SMS Center 120 to encapsulate the notification message as a SMS PUSH message, to send to the wireless communications device via the SMSC. In response to receipt of the firmware upgrade notification message 222, WCD 102 retrieves the content within the notification message 222. The content of the notification message 222 informs the WCD 102 or a user of the WCD 102 to request a firmware upgrade via FOTA transfer of firmware that will enable the WCD 102 to be able to identify and process the first type of data content when received in the future. The content also comprises addressing information of a network location, accessible to the WCD 102, and at which the WCD 102 can request the firmware upgrade. WCD 102 then transmits, to the identified network location, a request for the firmware upgrade and specific device information of WCD 102. In a first embodiment, the transmission of the request for the firmware upgrade is automatically triggered on receipt of the notification message by the WCD 102. In a second embodiment, the transmission is initiated by a selection by a user of the WCD 102 to access the network location in order to request the firmware upgrade. This user-initiated request may also require that the user provide payment information in order to update the firmware of the WCD 102, in one implementation of the second embodiment.

In response to WCD 102 requesting the firmware upgrade from the network location, which is communicatively connected to network server 114, network server 114 selectively determines a specific type of firmware upgrade to provide to WCD 102. This selective determination can be based on at least one of (a) an error type associated with the notification message that WCD 102 uses to access network server 114 and (b) the specific device information provided by WCD 102 while the WCD 102 is connected to the network location. In one embodiment, network server 114 selects an appropriate update package based on the specific device information provided by WCD 102 at the network location. Thus, in this embodiment, the network server 114 can perform the selection of the update package independent of receiving any additional information other than the information obtained directly from WCD 102. In addition to the specific device information, the information provided by WCD 102 can include the error type identifier, which is automatically associated with the notification message that is received by WCD 102 and utilized to access the network location, and other information that may be associated with the specific notification message.

In another embodiment, the message processing system 112 receives specific device information from the Home Location Register (HLR) 118 (FIG. 1), which information enables selection of an appropriate firmware update package as well as a device ID to which the FOTA update is to be sent. The message processing system 112 is able to provide this specific device information to the network server 114 and/or associate this specific device information with the notification message.

In another embodiment, WCD 102 (or a user of WCD 102) selects the appropriate update package, based on a model and/or type of WCD 102. Once the firmware update package is received by WCD 102, WCD 102 performs the firmware upgrade using the selected update package. In one embodiment, a payment mechanism is included within the network location that is accessed by the WCD 102 to request the firmware upgrade from network server 114. WCD 102 is then able to provide payment via the payment mechanism in order to receive the particular firmware upgrade.

In one embodiment, and as introduced above, the accessible network server 114 is FOTA server 114, which enables FOTA-initiated upgrades for wireless communications devices that can receive and process FOTA updates. In another embodiment, the network server 114 is a device management (DM) server that is able to provide FOTA updates and/or operates as a FOTA server. Thus, with these embodiments, the wireless communications device (e.g., WCD 102) should have the required hardware and/or firmware components that enable the wireless communications device to receive and process FOTA upgrades. In one embodiment, in response to receipt of the error message indicating a first type of error, the message processing system 112 determines whether the wireless communications device supports the FOTA transfer protocol. In response to a determination that the wireless communications device supports the FOTA transfer protocol, the USSD Gateway 112 sends the firmware upgrade notification message, which includes information that the firmware upgrade can be completed via FOTA transfer. The wireless communications device is able to access the FOTA server using access information (e.g., a URL for an associated network location or for the FOTA server) provided in the firmware upgrade notification message in order to request the firmware upgrade via FOTA transfer.

Figure 3:
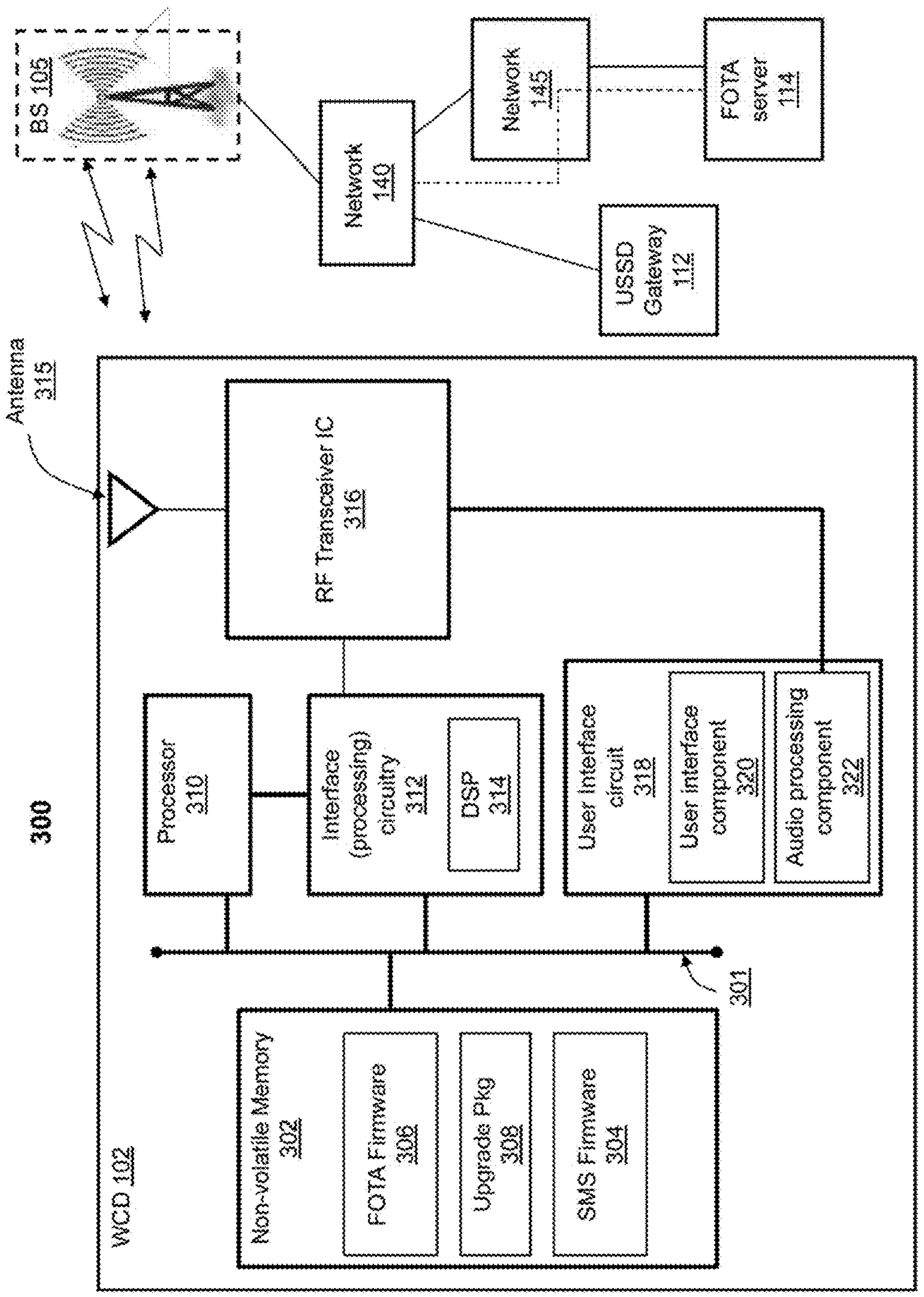
FIG. 3 illustrates a block diagram representation of an example wireless communications device within a wireless communications network, according to one embodiment.

Key aspects of the described embodiments reference a target wireless communications device having certain specific capabilities, while not having the required firmware to support other desired functionality. FIG. 3 illustrates an example block diagram of an example wireless communications device 102 within a wireless communications network (300), according to one embodiment. In one embodiment, the wireless communications device is a mobile cellular device/phone. However, in alternate embodiments, WCD 102 can be any type of communication device with a wireless transceiver that enables wireless communication of signals with WCN 100. WCD 102 comprises processor 310 and communication interface circuitry 312, which comprises digital signal processor (DSP) 314. Processor 310 and communication interface circuitry 312 are connected to non-volatile memory 302 via signal interconnect 301. WCD 102 also comprises user interface circuit 318, which comprises and/or is associated with user interface component(s) 320, e.g., input buttons, keypad, and touch-screen, and audio processing components 322, e.g., audio speaker and microphone.

WCD 102 includes a radio frequency (RF) transceiver integrated circuit (IC) 316 and antenna 315 that enable WCD 102 to send and receive communication signals via a wireless air interface, illustrated by the bi-directional arrow between antenna 315 and BS 105. In at least one embodiment, the transmitting and receiving functions of the transceiver IC 316 is facilitated by at least one antenna, antenna 315, coupled to the transceiver IC 316. WCD 102 is able to wirelessly communicate with, for example, base station (BS) 105 via antenna 315. BS 105 enables WCD 102 to establish a connection to USSD Gateway 112 via CDMA-ANSI-41 network infrastructure 140. In addition, WCD 102 can also connect to network/FOTA server 114 via at least one of network infrastructure 140 and external network 145 (e.g., Internet).

Illustrated within non-volatile memory 302 are a number of software, firmware, and/or logic components (or modules), including SMS firmware 304, FOTA receiving firmware 306 and firmware upgrade package 308. SMS firmware 304 and FOTA receiving firmware 306 respectively enables WCD 102 to be able to receive a firmware upgrade notification message as an SMS message and receive a firmware upgrade package 308 from FOTA server 114. Following a successful upgrade of the firmware of WCD 102 with firmware upgrade package 308, WCD 102 becomes capable of processing messages containing the first type of data content.

Figure 4:
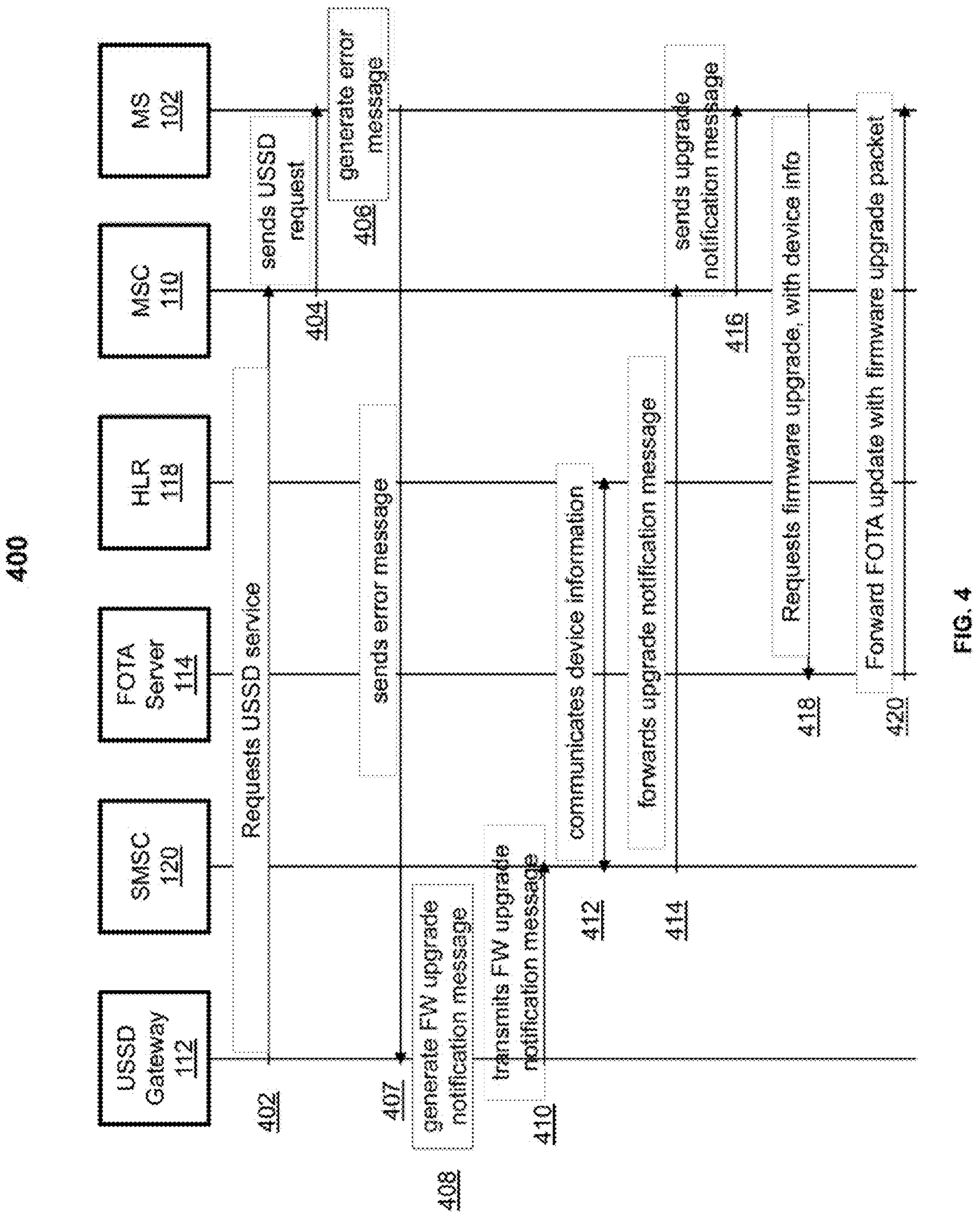
FIG. 4 is a messaging and signaling flow diagram illustrating a sequence of messages that are transmitted from one component to another within the wireless communication network to enable a failure event at a wireless communications device to trigger transmission of a firmware upgrade notification message, according to one embodiment.

FIG. 4 is a message and/or signal flow diagram illustrating an example sequence of messages that are transmitted between various network components of FIG. 1 based on functionality described within the descriptions of FIGS. 1-3, which enable a failure event at a wireless communications device, particularly WCD 102, to trigger transmission of a firmware upgrade notification message and ultimately be provided a FOTA upgrade package. This triggering of the firmware causes the automatic and/or automatically performed actions described herein. In this particular illustration, message flow sequence 400 comprises ten (10) messages, although a different number of messages and/or a different message path can be utilized for different embodiments. USSD Gateway 112 transmits first message 402, which is a message intended for WCD 102. The first message is first received by MSC 110, which determines whether USSD service access to WCD 102 can be provided within the wireless communications network. In response to MSC 110 granting the USSD service access, MSC 110 enables the USSD request (or notification) message to be sent to WCD 102, as indicated by message 404. Following receipt of the USSD request or notification message, WCD 102 attempts to process the data content within the USSD message and determines that WCD 102 is not able to process and/or recognize the type of data content. In response to not being able to process and/or recognize the type of data content within the received USSD message, WCD 102 generates an error message. In particular, WCD 102 can generate the error message, as indicated by message 406, in response to not having the required firmware to recognize and process aspects of the data type, such as the operation type(s), associated with the received USSD message. WCD 102 transmits the error message to USSD Gateway 112, as indicated by message 407. Following receipt of the error message, USSD Gateway 112 generates a firmware update notification message based on pre-configured information about FOTA server 114. The firmware update notification includes the URL of FOTA server 114.

In response to determining that the WCD 102 is unable to process the type of data content in the USSD request message, USSD Gateway 112 initiates transmission of a firmware upgrade notification message to WCD 102. In particular, USSD Gateway transmits the firmware upgrade notification message to SMS center 120, as indicated by message 410, in order for SMSC 120 to send the firmware upgrade notification message to WCD 102 using SMS messaging. SMSC 120 communicates with HLR 118, as illustrated by message 412, to request and receive ID information for WCD 102 to enable transmission of an SMS message to WCD 102. As indicated by message 414, the firmware upgrade notification message is first sent to MSC 110. As illustrated by message 416, MSC 110 sends the firmware upgrade notification message to WCD 102, the intended target, using SMS messaging. WCD 102 accesses FOTA server 114 to request the firmware upgrade, as indicated by message 418. Then, FOTA server 114 forwards a firmware upgrade package to WCD 102 via FOTA update message 420.

Figure 5:
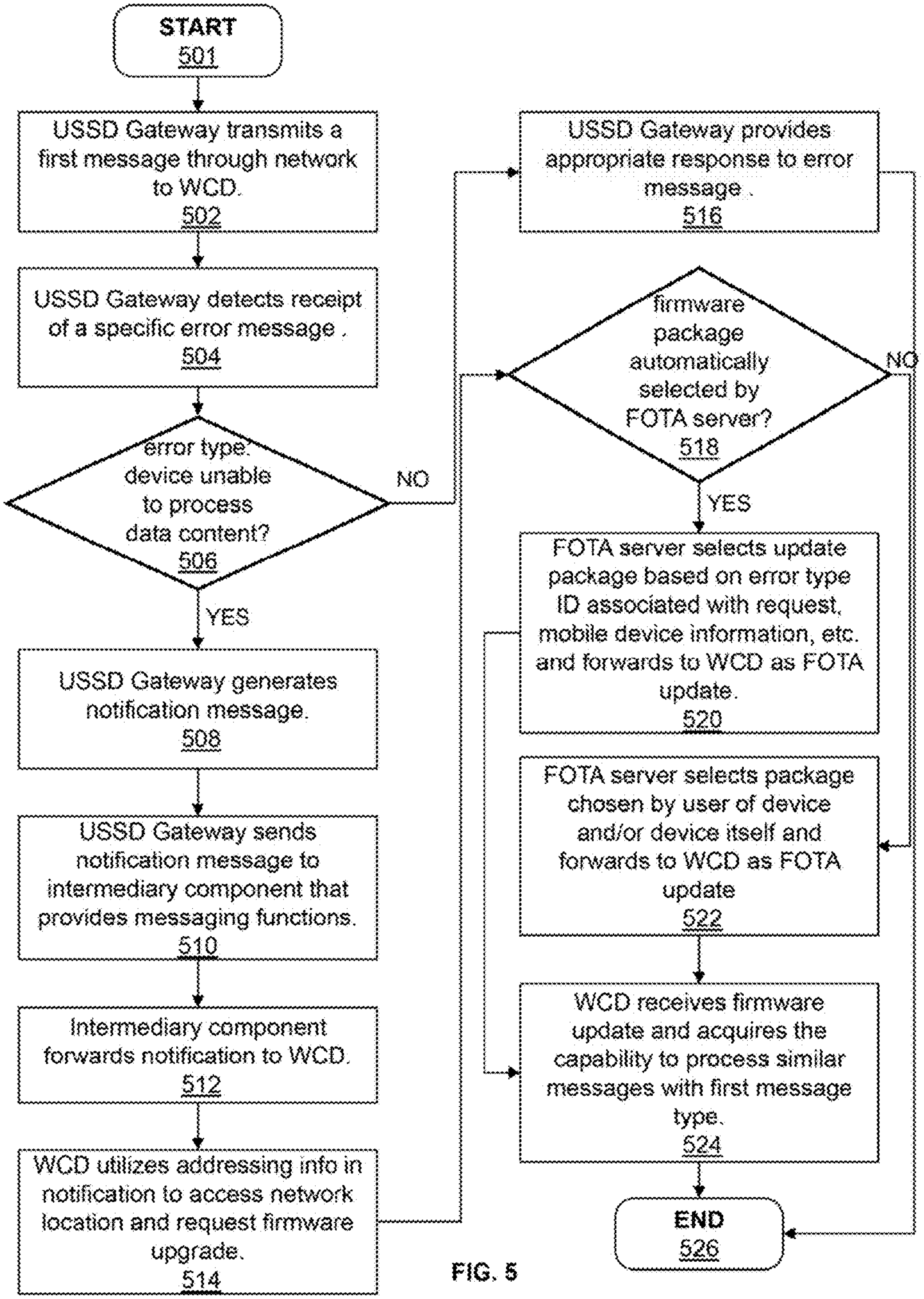
FIG. 5 is a flow chart illustrating the method for triggering a firmware update request by a wireless communications device in response to receiving information identifying the occurrence of a failure event at the wireless communications device, according to one embodiment.

FIG. 5 is a flow chart illustrating the method by which the above process of the illustrative embodiments is completed. Although the method illustrated in FIG. 5 may be described with reference to components and functionality illustrated by and described in reference to FIGS. 1-4, it should be understood that this is merely for convenience and alternative components and/or configurations thereof can be employed when implementing the various methods. Certain portions of the methods can be completed by FUN logic 220 executing on one or more processors (processor 202) within a network server, such as is generally described in FIG. 2, or more specifically within USSD Gateway 112 (FIGS. 1, 2 and/or 4). The executed processes then control specific operations of or on USSD Gateway 112. For simplicity is describing the methods, all method processes are described from the perspective of USSD Gateway 112; However, other network components can be described as performing certain secondary functions required to support the overall functionality of USSD gateway 112, which involves automatically triggering a request by a WCD for a firmware upgrade in response to a particular type of error notification received from the WCD when a message having a first type data content is sent to the WCD.

FIG. 5 illustrates the method by which USSD gateway 112 triggers WCD 102 (FIG. 3) to make a firmware update request in response to a specific failure event at WCD 102, according to one embodiment. The method begins at initiator block 501 and proceeds to block 502 at which USSD Gateway 112 generates and transmits a first message via the network to WCD 102. At block 504, USSD gateway 112 detects receipt of a specific error message. At decision block 506, USSD Gateway 112 determines whether the error message is a type of error message that indicates that WCD 102 is unable to process certain data and/or operation types within a previously transmitted USSD message that was sent to WCD 102. If at decision block 506, USSD Gateway 112 determines that the error message is a first type of error message that indicates that WCD 102 is unable to process the data and/or operation types within the USSD message, USSD Gateway 112 generates a firmware update notification message which includes the URL of FOTA server 114, as shown at block 508. However, if at decision block 506 USSD Gateway 112 determines that the error message is not a type of error message that indicates that WCD 102 is unable to process data and/or operation types within the USSD message, the method proceeds to block 514, at which USSD Gateway 112 provides the appropriate response to the error message.

At block 510, USSD Gateway 112 generates and sends a firmware upgrade notification message to an intermediary component that provides messaging functions. At block 512, the intermediary component forwards the firmware upgrade notification message to WCD 102. The firmware upgrade notification message comprises addressing information to be utilized by WCD 102 to access a network location and request a corresponding firmware upgrade. In addition, the firmware upgrade notification message informs WCD 102 to transmit, to the network location, a request for the firmware upgrade and specific device information of WCD 102. In one embodiment, for example, in an automatic selection process for firmware upgrades, the firmware upgrade notification message triggers WCD 102 to autonomously transmit the request for the firmware upgrade and the specific device information to the network location. In another embodiment, for example, which provides a manual selection process for firmware upgrades, the firmware upgrade notification message alerts a user of WCD 102 to access the network location and manually request the firmware upgrade from the network server. At block 516, WCD 102 utilizes the firmware upgrade notification message to access the identified network location to request a firmware upgrade. The process then proceeds to decision block 518.

At decision block 518, FOTA server 114 determines whether a firmware upgrade to be provided to WCD 102 requires automatic selection of an appropriate firmware upgrade package by FOTA server 114 or, alternatively, involves manual selection of the appropriate firmware upgrade package by WCD 102. In one embodiment, FOTA server 112 can determine whether to provide the automatic selection or require the manual selection based on the type of information about WCD 102 that FOTA server 114 can automatically access at the time the firmware upgrade request is provided by WCD 102 to FOTA server 114. In one embodiment, USSD Gateway 112 obtains additional, relevant information about WCD 102 via HLR 118 and includes the additional information within the notification message that USSD Gateway 112 provides to WCD 102. In one embodiment, this additional information specifies the device type and model of WCD 102. In another embodiment, this additional information is provided by the wireless communications device and/or device subscriber during a manual selection process for the firmware upgrade.

If at decision block 518, FOTA server 114 determines, based on the availability of the additional information, that the firmware upgrade is provided to WCD 102 by automatic selection of an appropriate upgrade package, FOTA server 114 selectively determines a specific type of firmware upgrade to provide to WCD 102 and selects an appropriate update package based on at least one of the information obtained about WCD 102 from other network components (e.g., HLR 118), identification of the error type that is automatically associated with the notification message and the upgrade request, other information associated with the request from the WCD 102, and the specific device information provided by WCD 102 at the network location, as shown at block 520. For example, FOTA server 114 is able to automatically retrieve, from a Hypertext Transfer Protocol (HTTP) header of the message request, additional information associated with at least one of the error type associated with the notification message and wireless communications device specifications. Furthermore, WCD 102 receives the selected firmware upgrade package and acquires the capability to process data and/or operation types within USSD messages, as shown at block 524. However, if at decision block 518 FOTA server 114 determines that the firmware upgrade package is selected by WCD 102 via manual selection at the network location, WCD 102 can manually request the firmware upgrade from the network server, and provide within the upgrade request at least one of (a) a model number and type of the wireless communication device and (b) a selection of an appropriate firmware update package, based on the model number and type of the wireless communications device. Furthermore, FOTA server 114 is able to forward the manually selected and appropriate firmware upgrade package to WCD 102 based on the notification message that WCD 102 uses to access the network location and information received via the manual request for the firmware upgrade, as shown at block 522. WCD 102 then receives the selected firmware upgrade package, and acquires the capability to process data and/or operation types within USSD messages (block 524). The process ends at block 526.

The flowchart, message flow diagram and block diagrams in the various figures presented and described herein illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

In some implementations, certain processes of the methods are combined, performed simultaneously or in a different order, or perhaps omitted, without deviating from the spirit and scope of the invention. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for enabling firmware updates of wireless communications devices, the method comprising:

sending a first message having a first type of data content from a message processing system to a wireless communications device, wherein the message processing system and the wireless communication device are communicatively connected within a wireless communications network that includes a mobile switching center, and wherein if the wireless communication device lacks a firmware upgrade, then the first type of data content is unrecognizable by the wireless communication device;

receiving, by the message processing system, an error message that indicates that the wireless communications device does not recognize the first type of data content, the message processing system being different from the mobile switching center;

retrieving, by the message processing system, identifying information about a particular error type, among multiple different possible error types, from the error message; and in response to receipt, by the message processing system, of the error message, automatically triggering a transmission to the wireless communications device of a firmware upgrade notification message which triggers the wireless communications device to request, from an accessible network server, the firmware upgrade that enables the wireless communications device to be configured to recognize the first type of data content, the accessible network server being different from the message processing system, wherein:

said message processing system is an unstructured supplementary service data (USSD) gateway;

said sending the first message comprises sending as USSD at least one of a USSD notification or a USSD request for information;

the wireless communications network supports Code Division Multiple Access (CDMA) wireless protocol; and said wireless communications device is a CDMA enabled subscriber device.

2. The method of claim 1, wherein said automatically triggering comprises:

determining that the particular error type is a first error type among the multiple different possible error types, wherein the first error type specifically indicates that the wireless communications device is unable to recognize the first type of data content;

generating the firmware upgrade notification message, in response to determining that the particular error type is the first error type; and sending the firmware upgrade notification message to an intermediary network component that provides message forwarding operations within the wireless communications network to the wireless communications device.

3. The method of claim 2, wherein the sending the firmware upgrade notification message to the intermediary network component comprises:

transmitting the firmware upgrade notification message to at least one intermediary network component that transmits a second message having a second type of data content recognized by the wireless communications device, wherein the at least one intermediary network component is one of a PUSH gateway or a short message service center (SMSC).

4. The method of claim 2, wherein:

the firmware upgrade notification message comprises addressing information to be utilized by the wireless communications device to access a network location and request a corresponding firmware upgrade; and the firmware upgrade notification message informs the wireless communications device to transmit, to the network location, a request for the firmware upgrade and specific device information of the wireless communication device.

5. The method of claim 4, wherein:

the firmware upgrade notification message triggers the wireless communications device to autonomously transmit the request for the firmware upgrade and the specific device information to the network location;

the network server selectively determines a specific type of firmware upgrade to provide to the wireless communications device and selects an appropriate update package based on at least one of an error type associated with the firmware upgrade notification message, the request, and the specific device information provided by the wireless communications device at the network location; and the firmware upgrade performed at the wireless communications device utilizes the appropriate update package selected by the network server.

6. The method of claim 4, wherein:

the firmware upgrade notification message received by the wireless communications device alerts a user of the wireless communications device to access the network location, manually make a request for the firmware upgrade from the network server, and provide within the request at least one of (a) a model number and type of the wireless communication device and (b) a selection of an appropriate firmware update package, based on the model number and type of the wireless communications device; and the network server selects the appropriate firmware upgrade package and forwards the appropriate firmware upgrade package to the wireless communications device based on an error type associated with the firmware upgrade notification and information received via the request for the firmware upgrade.

7. The method of claim 1, wherein:

the firmware upgrade notification message is a Wireless Application Protocol (WAP) PUSH message;

said accessible network server is a firmware over the air (FOTA) server that enables transmission of FOTA upgrades to wireless communications devices configured to receive and process FOTA updates;

the wireless communications device comprises components that enable the wireless communications device to receive and process FOTA upgrades; and the method comprises:

determining whether the wireless communications device supports the FOTA transfer protocol; and in response to determining that the wireless communications device supports the FOTA transfer protocol, said message processing system sends said firmware upgrade notification message to initiate a firmware upgrade process via a FOTA update that enables the wireless communication device to recognize the first type of data content.

8. A message processing system communicatively connected within a wireless communications network to at least one wireless communications device, the system comprising:

a processor;

a memory component coupled to the processor;

a communications port coupled to the processor that enables connection of the message processing system to at least one other device within the wireless communications network; and device messaging logic associated with the processor that is configured to:

send a first message having a first type of data content from the message processing system to a wireless communications device, wherein the message processing system and the wireless communication device are communicatively connected within the wireless communications network that includes a mobile switching center, and wherein if the wireless communication device lacks a firmware upgrade, then the first type of data content is unrecognizable by the wireless communication device;

receive, by the message processing system, an error message that indicates that the wireless communications device does not recognize the first type of data content, the message processing system being different from the mobile switching center;

retrieve, by the message processing system, identifying information about a particular error type, among multiple different possible error types, from the error message; and in response to receipt, by the message processing system, of the error message, automatically trigger a transmission to the wireless communications device of a firmware upgrade notification message which triggers the wireless communications device to request, from an accessible network server, the firmware upgrade that enables the wireless communications device to be configured to recognize the first type of data content, the accessible network server being different from the message processing system, wherein:

said message processing system is an unstructured supplementary service data (USSD) gateway;

the first message comprises, as USSD, at least one of a USSD notification or a USSD request for information;

the wireless communications network is configured to support Code Division Multiple Access (CDMA) wireless protocol; and said wireless communications device is a CDMA enabled subscriber device.

9. The system of claim 8, wherein the device messaging logic that is configured to automatically trigger the transmission of the firmware upgrade notification message further comprises messaging logic that is configured to:

determine that the particular error type is a first error type among the multiple different possible error types, wherein the first error type specifically indicates that the wireless communications device is unable to recognize the first type of data content;

generate the firmware upgrade notification message in response to determining that the particular error type is the first error type; and send the firmware upgrade notification message to an intermediary network component that provides message forwarding operations within the wireless communications network to the wireless communications device.

10. The system of claim 9, wherein said messaging logic that is configured to send the firmware upgrade notification message to the intermediary network component further comprises messaging logic that is configured to:

transmit the firmware upgrade notification message to at least one intermediary network component that transmits a second message having a second type of data content recognized by the wireless communications device, wherein the at least one intermediary network component is one of a PUSH gateway or a short message service center (SMSC).

11. The system of claim 9, wherein:

the firmware upgrade notification message comprises addressing information that is configured to be utilized by the wireless communications device to access a network location and request a corresponding firmware upgrade; and the firmware upgrade notification message is configured to inform the wireless communications device to transmit, to the network location, a request for the firmware upgrade and specific device information of the wireless communication device.

12. The system of claim 11, wherein:

the firmware upgrade notification message is configured to trigger the wireless communications device to autonomously transmit the request for the firmware upgrade and the specific device information to the network location;

the network server is configured to selectively determine a specific type of firmware upgrade to provide to the wireless communications device and to select an appropriate update package based on at least one of an error type associated with the firmware upgrade notification message, the request, and the specific device information provided by the wireless communications device at the network location; and the firmware upgrade performed at the wireless communications device is configured to utilize the appropriate update package selected by the network server.

13. The system of claim 11, wherein:

the firmware upgrade notification message received by the wireless communications device is configured to alert a user of the wireless communications device to access the network location, manually make a request for the firmware upgrade from the network server, and provide within the request at least one of (a) a model number and type of the wireless communication device and (b) a selection of an appropriate firmware update package, based on the model number and type of the wireless communications device; and the network server is configured to select the appropriate firmware upgrade package and to forward the appropriate firmware upgrade package to the wireless communications device based on an error type associated with the firmware upgrade notification message and information received via the request for the firmware upgrade.

14. The system of claim 8, wherein:

the firmware upgrade notification message is a Wireless Application Protocol (WAP) PUSH message;

said accessible network server is a firmware over the air (FOTA) server that enables transmission of FOTA upgrades to wireless communications devices configured to receive and process FOTA updates;

the wireless communications device comprises components that enable the wireless communications device to receive and process FOTA upgrades; and the device messaging logic is configured to:

determine whether the wireless communications device supports the FOTA transfer protocol; and in response to determining that the wireless communications device supports the FOTA transfer protocol, send said firmware upgrade notification message to initiate a firmware upgrade process via a FOTA update that enables the wireless communication device to recognize the first type of data content.

15. A non-transitory computer-readable medium storing computer code for controlling a processor to cause the processor to enable firmware update of wireless communications devices, the computer code including instructions to cause the processor to:

send an unstructured supplementary service data (USSD) message having a first type of data content from a USSD Gateway to a wireless communications device, wherein the USSD Gateway and wireless communication device are communicatively connected within the wireless communications network that includes a mobile switching center, and wherein if the wireless communication device lacks a firmware upgrade, then the first type of data content is unrecognizable by the wireless communication device;

receive, by the USSD Gateway, an error message that indicates that the wireless communications device does not recognize the first type of data content, the USSD Gateway being different from the mobile switching center;

retrieve, by the USSD Gateway, identifying information about a particular error type, among multiple different possible error types, from the error message; and in response to receipt, by the USSD Gateway, of the error message, automatically trigger a transmission to the wireless communications device of a firmware upgrade notification message which causes the wireless communications device to transmit a request, to a specific network location, for the firmware upgrade that enables the wireless communications device to be configured to recognize the first type of data content, the specific network location being different from the USSD Gateway.

16. The non-transitory computer-readable medium of claim 15, wherein:

the wireless communications device is a Code Division Multiple Access (CDMA) compliant device and comprises hardware and firmware components for receiving and processing the firmware over the air (FOTA) update; and said instructions to cause the processor to automatically trigger comprises instructions to cause:

the USSD gateway to generate the firmware upgrade notification message in response to receipt of the error message; and instructions to cause the processor to send the firmware upgrade notification message to at least one intermediary network component, from one of a PUSH gateway or a short message service center (SMSC), that provides to the wireless communications device Wireless Application Protocol (WAP) PUSH messages having a second type of data content that is recognized by the wireless communications device, and wherein the firmware upgrade notification message provides the wireless communications device with instructions for the wireless communications device to access a specific network location and initiate the firmware upgrade.

17. The non-transitory computer-readable medium of claim 16, wherein:

the firmware upgrade notification message triggers the wireless communications device to automatically access the specific network location with the request for the firmware upgrade and the specific network location provides the request to a FOTA server, the FOTA server enables FOTA upgrades for wireless communications devices configured to receive and process FOTA updates; and the instructions to cause the processor to automatically trigger further comprises instructions to cause the processor to:

determine that the particular error type is a first error type among the multiple different possible error types, wherein the first error type specifically indicates that the wireless communications device is unable to recognize the first type of data content, wherein the instructions to cause the processor to automatically trigger are initiated in response to the particular error type being identified as the first error type.

18. The non-transitory computer-readable medium of claim 17, wherein:

the firmware update notification message causes the wireless communications device to connect to the specific network location and transmit specific device information along with the request;

the FOTA server is configured to selectively determine a specific type of firmware upgrade to provide to the wireless communications device based on the error type and the specific device information; and the FOTA server is configured to forward a selected firmware update package to the wireless communications device via FOTA transfer.

* * * * *